United States Patent [19]

Au Coin et al.

[11] 4,118,211

[45] Oct. 3, 1978

[54] METHOD OF MAINTAINING THE STRENGTH OF OPTICAL FIBERS

[75] Inventors: Thomas R. Au Coin, Ocean; Sam Di Vita, West Long Branch; Melvin J. Wade, Howell, all of N.J.

[73] Assignee: The United States of America as represented by the Secretary of the Army, Washington, D.C.

[21] Appl. No.: 808,927

[22] Filed: Jun. 22, 1977

[51] Int. Cl.$^2$ .......................... G02B 1/10; G02B 5/14
[52] U.S. Cl. .................................. 65/3 R; 427/163
[58] Field of Search ..................... 427/163; 65/3 R

[56] References Cited

U.S. PATENT DOCUMENTS

| | | | |
|---|---|---|---|
| 2,893,895 | 7/1959 | Claussen | 65/3 R X |
| 3,540,870 | 11/1970 | Li | 65/3 R X |

*Primary Examiner*—James R. Hoffman
*Attorney, Agent, or Firm*—Nathan Edelberg; Jeremiah G. Murray; Roy E. Gordon

[57] ABSTRACT

The mechanical strength of an optical fiber is maintained by coating the fiber with an inorganic ceramic material that is impervious to both moisture and chemically corrosive environments. The ceramic coating is applied immediately after the fiber is drawn.

7 Claims, No Drawings

METHOD OF MAINTAINING THE STRENGTH OF OPTICAL FIBERS

The invention described herein may be manufactured, used, and licensed by or for the Government for governmental purposes without the payment to us of any royalty thereon.

BACKGROUND OF THE INVENTION

This invention relates in general to a method of coating an optical fiber, and in particular to such a method that is carried out immediately after the fiber is drawn and that results in maintaining the mechanical strength of the optical fiber after the fiber has been drawn.

Typical tensile strengths observed for silicon optical fibers at the time the fibers are drawn are on the order of 1 million p.s.i. In certain optical communications, it is necessary to employ optical fibers having lengths above 1 kilometer. The problem in the art when using such long lengths of optical fibers has been the fiber's lack of adequate mechanical strength. That is, the tensile strength of long lengths of commercially available optical fibers is in the range of 15,000 to 20,000 p.s.i. A mechanical strength above 200,000 p.s.i., however, is needed for optical fibers when used as optical waveguides in certain specialized applications, as for example, in rapid payout communication systems employing long lengths of fiber.

The reason that long lengths of fibers have not been prepared with sufficient mechanical strength has been due to the presence of submicron surface flaws caused either by light mechanical abrasion during and after the usual fiber drawing operation and/or by chemical attack by atmospheric contaminants such as moisture. Attempts to solve these problems have been made by applying organic coatings to these fibers after the fibers have been drawn. However, these organic coatings have not been impervious to moisture or hydroxyl ion diffusion. This has led to the reduced strength of organic coated fibers during periods of use or storage.

SUMMARY OF THE INVENTION

The general object of this invention is to provide a method of maintaining the mechanical strength of optical fibers immediately after the fibers are drawn. A further object of the invention is to provide such a method that will protect the optical fiber from the detrimental effects of mechanical abrasion and chemical attack by atmospheric contaminants including moisture, alkalies, acids, and gases. A particular object of the invention is to provide such a method that will be effective in maintaining the mechanical strength of an optical fiber over 1 kilometer in length.

It has now been found that the foregoing objects can be attained by coating the optical fibers with a thin, durable, hermetic inorganic layer immediately after the fibers are drawn to final size. The inorganic coatings used in the method are of ceramic materials that are impervious to chemical attack by liquids and atmospheric contaminants and capable of being applied to the fiber by conventional chemical vapor deposition techniques. Such ceramic materials include silicon nitride, boron nitride, tin oxide, and titanium dioxide. The inorganic coating is applied as the fiber is freshly drawn from a melt. Thus, the fiber will have an inorganic coating or layer even before the fiber cools to the point where ambient moisture, chemical corrosion, or mechanical abrasion can detrimentally affect the strength of the optical fiber.

DESCRIPTION OF THE PREFERRED EMBODIMENT

A portion of a high purity fused silica preform rod is melted at about 1800° C in a fiber drawing furnace. A fiber is drawn from the melt and then, a layer of silicon nitride is immediately deposited on the freshly drawn fiber by a chemical vapor deposition method using ammonia, silane, and nitrogen as a carrier gas, at temperatures ranging from 600° C to 1000° C according to the reaction:

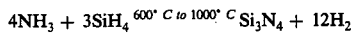

$$4NH_3 + 3SiH_4 \xrightarrow{600° C \text{ to } 1000° C} Si_3N_4 + 12H_2$$

The deposition is carried out in a silicon nitride chemical vapor deposition reactor. Layers of silicon nitride from about 0.02 to 0.20 micrometer in thickness are deposited on the fused silica fiber which has been drawn to a diameter of about 0.1 millimeter.

After 1 month of exposure to ambient humidity, it is found that the nitride coated fibers are considerably stronger than uncoated fibers. That is, they display almost twice the tensile strength after 34 days of exposure to room humidity.

In lieu of fused silica as the optical fiber, one might use borosilicate glass, alkali-lead silicate glass, or fused silica that has been doped with uranium, germanium, or fluorine. In lieu of the chemical vapor deposition method, one might use other coating techniques such as vacuum vapor deposition, sputtering, ion-beam and arc plasma.

The thickness of the drawn fiber ranges from 0.05 millimeter to 0.15 millimeter in diameter.

The thickness of the inorganic coating ranges from 0.02 micrometer to 0.20 micrometer.

The method of the invention is advantageous in that it enables the fiber to be hermetically sealed in an inorganic or ceramic coating which is not subject to oxidation or corrosion, and which is impervious to moisture, gases and chemically corrosive environments. Moreover, the coatings have a relatively low thermal coefficient of expansion which closely matches the thermal expansion coefficient of the optical fiber. This results in hermetically sealed optical fibers having good thermal shock resistances.

The optical fibers, when coated according to the method of the invention, are especially useful as optical links between airborne vehicles and ground bases.

We wish it to be understood that we do not desire to be limited to the exact details described, for obvious modifications will occur to a person skilled in the art.

What is claimed is:

1. Method of maintaining the mechanical strength of optical fibers after the fibers have been drawn from a melt, said method comprising hermetically sealing said fibers with a coating of silicon nitride that is impervious to both moisture and chemically corrosive environments immediately after the optical fiber has been drawn from the melt.

2. Method of maintaining the mechanical strength of optical fibers after the fibers have been drawn from a melt, said method comprising hermetically sealing said fibers with a coating of boron nitride that is impervious to both moisture and chemically corrosive environments immediately after the optical fiber has been drawn from the melt.

3. Method of maintaining the mechanical strength of optical fibers after the fibers have been drawn from a melt, said method comprising hermetically sealing said fibers with a coating of titanium dioxide that is impervious to both moisture and chemically corrosive environments immediately after the optical fiber has been drawn from the melt.

4. Method of producing an optical fiber of high mechanical strength from a high purity fused silica preform rod, said method including the steps of
(A) heating the preform rod at about 1800° C to form a melt,
(B) drawing a fiber from the melt, and
(C) hermetically sealing the fiber with a coating of silicon nitride that is impervious to both moisture and chemically corrosive environments immediately after drawing the fiber from the melt.

5. Method of producing an optical fiber of high mechanical strength from a high purity fused silica preform rod, said method including the steps of
(A) heating the preform rod at about 1800° C to form a melt,
(B) drawing a fiber from the melt, and
(C) hermetically sealing the fiber with a layer of boron nitride that is impervious to both moisture and chemically corrosive environments immediately after drawing the fiber from the melt.

6. Method of producing an optical fiber of high mechanical strength from a high purity fused silica preform rod, said method including the steps of
(A) heating the preform rod at about 1800° C to form a melt,
(B) drawing a fiber from the melt, and
(C) hermetically sealing the fiber with a coating of titanium dioxide that is impervious to both moisture and chemically corrosive environments immediately after drawing the fiber from the melt.

7. Method of producing an optical fiber of high mechanical strength from a high purity fused silica preform rod, said method including the steps of
(A) heating the preform rod at about 1800° C to form a melt,
(B) drawing a fiber from the melt, and
(C) hermetically sealing the fiber with a layer of silicon nitride of about 0.02 to 0.20 micrometer in thickness obtained by a chemical vapor deposition process using ammonia, silane, and nitrogen as a carrier gas at temperatures ranging from about 600° C to about 1000° C according to the reaction:

$$4NH_3 + 3SiH_4 \xrightarrow{600° C \text{ to } 1000° C} Si_3N_4 + 12H_2$$

immediately after drawing the fiber from the melt.

* * * * *